United States Patent [19]

Staggl et al.

[11] Patent Number: 4,921,167
[45] Date of Patent: May 1, 1990

[54] CARRIER SECTION INCLUDING FLANGE MEMBER FOR CONNECTION TO A GUIDE RAIL

[75] Inventors: Roland Staggl; Hartwig Sprung, both of Wetter; Eberhard Becker, Hagen, all of Fed. Rep. of Germany

[73] Assignee: Mannesmann AG, Duesseldorf, Fed. Rep. of Germany

[21] Appl. No.: 271,035

[22] Filed: Nov. 14, 1988

[30] Foreign Application Priority Data

Nov. 13, 1987 [DE] Fed. Rep. of Germany ....... 3739090

[51] Int. Cl.$^5$ ............................................ E01B 25/00
[52] U.S. Cl. .................................... 238/126; 238/310; 238/338; 104/95
[58] Field of Search .................... 104/89, 245, 247, 95; 238/126, 338, 342, 121, 122, 134, 140, 310, 331, 340, 336; 901/16

Primary Examiner—Andres Kashnikow
Assistant Examiner—Mark T. Le
Attorney, Agent, or Firm—Ralf H. Siegemund

[57] ABSTRACT

A connection assembly for connecting guide rails to the flange of a load carrying member includes clamping elements and bolt members in-connection with the T-shaped groove of the flange of the load carrying member and the guide rails for securing the guide rails to the flange. The flange includes flange parts inwhich each further includes clamping surfaces separated by an indent which is not in abutment with the respective guide rails when the clamping surfaces are in engagement with the respective guide rail. The connection assembly further includes holding rails associating with the flange parts, the clamping elements and bolt members in a manner to sandwich the guide rails between the holding rails and the flange parts.

11 Claims, 2 Drawing Sheets

CARRIER SECTION INCLUDING FLANGE MEMBER FOR CONNECTION TO A GUIDE RAIL

BACKGROUND OF THE INVENTION

The present invention relates to a carrier section including flange member for connection to a guide rail or the like.

Section pieces of the type to which the invention pertains are shown in German printed patent application No. 35 10 051 (see also copending application, Ser. No. 071,634, now U.S. Pat. No. 4,836,111 filed July 7, 1987). Herein guide rails are provided for industrial manipulators, automated machine tools or the like. These guide rails are specifically connected to connecting flanges pertaining to load carrying sections of a frame arc carriage. The guide rails at least, and other parts, are for reasons of stringent strength requirements, manufactured of material which has a very high strength and is very hard owing to specific treatment of the material. Consequently such simple task as drilling bore holes for screws is difficult.

DESCRIPTION OF THE INVENTION

It is an object of the present invention to facilitate the connection of guide rails to carrier sections.

It is a specific object of the present invention to improve the connection between guide rails and carrier sections of the type outlined above including technology encompassed by the above identified application.

In accordance with the preferred embodiment of the present invention it is suggested to provide the flanges for the load carrying sections such that they establish a T-shaped insertion groove for clamping elements which on one hand abut narrow pressure surfaces in that slide-in groove while on the other hand they act against the rail through pressure and force engaging surfaces such that respective effective lines of forces acting on these pressure surfaces run through indents or recess, i.e. non-abutting surfaces situated between abutment surfaces for the rail. This is arranged and repeated preferably symmetrical on both sides of the respective clamping element. The clamping elements as inserted in the T-shaped grooves exert force with the respective clamping pressure surfaces only on pressure surfaces of the rail. The forces acting on the pressure surfaces are just effective in between the abutment surfaces of the load carrying profile such that any forces exerted by means of screws and the like and pertaining to the clamping elements are acted upon those abutment surfaces of the rail to both sides of the respective line of action. Broadly speaking the clamping structure broadly includes clamping elements proper and auxiliary holding rails that act onto the main rails such that the latter are sandwiched between these holding rails and the flanges of the hollow section.

These features establish an unambiguous force distribution such that the rails will not only be held positively on but will not tilt or undergo any undesirable motion as loads are being exerted. It can readily be seen that the rails can now be connected to the load carrying sections in a rather simple fashion, namely by changing without requiring any drill work. These rails still provide adequate and flawless guide structures for industrial robots or the like. Here then an exact positioning must remain within the tolerance of 1/10 mm vis-a-vis the guide rails. Certain space for running pulleys or rolls is provided between the lower edge of the load carrying section and the upper edge of the respective rail, laterally displaced from the clamping area and action.

In furtherance of the invention the clamping elements are constructed so as to be provided with a locking device for preventing the head of a screw, bolt or nut from turning. The abutment surfaces of the clamping elements may be limited through certain free space on the inside. The section for carrying and holding may be provided with abutment edges for the respective rail. The free space is provided for permitting clamping element to yield into such space on bending of the rail or of the section so that even under such severe conditions the clamping parts still provide for unambiguous force, action and distribution.

The holding rails each may be provided with U-shaped opening or groove provided next to or on the side opposite the pressure surfaces for the rails. These U-shaped spaces are open to the outside and are provided for receiving supplemental parts such as racks, control cams, limit switches, sensors or the like particularly position sensors for machine tool and industrial robot equipment that runs on the rail. In addition the U-shape reinforces the holding rails so that the holding elements proper can be spaced to a significant extent, e.g. they have to be provided only for distance of 200 mm from each other and still the rails are reliably clamped.

The main rails can be made from steel or non-ferrous metals. Small tolerances in thickness as far as the rails are concerned as well as deviations in parallelism of the abutment surfaces can be compensated through displacement and deformation of the clamping element without impairing the integrity of the holding of the rails by means of these clamping elements. One of them may be provided with an oblong slot for receiving a screw or bolt and permitting adjustment relative thereto.

In furtherance of the invention the load carrying section may be provided with additional slide-in grooves on the side facing away from the guide rail. These grooves may be provided for connection to compensation sections or the like including e.g. cable drag carriers in order to avoid warping. The compensation is preferably made from the same material as the rails and also the cross sectional area should be the same. This way distortions are avoided that may arise in case of temperature deviations and may, if permitted to go uncompensated warp the carrier and that will interfere with an adequate positioning of the guide rails. These features need to be provided for only if there are actually temperature changes to be expected or if in fact the existing temperature changes establish distortions and warping beyond the tolerable accuracy.

DESCRIPTION OF THE DRAWINGS

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

Proceeding now to the detailed description of the drawings FIG. 1 shows a frame comprised of load carrying sections 1 of the type shown also in FIG. 2 and others and being provided for accommodating an industrial machine tool and robot A on a carriage B which runs on larger rails. Also shown are posts carrying the structures and frame.

Figure 2:
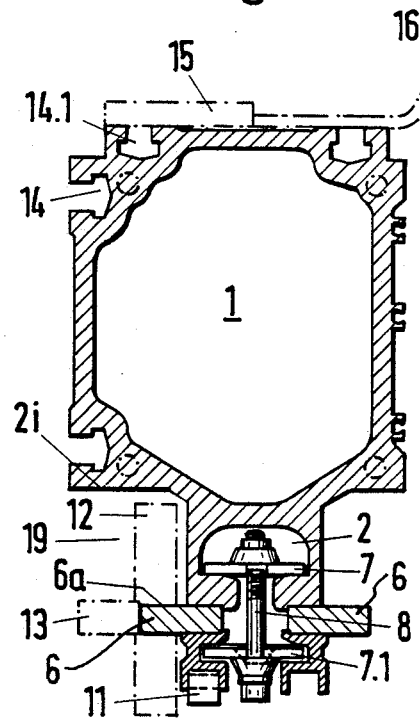
FIG. 2 is a cross section through a load carrying section of the system shown in FIG. 1 and being improved in accordance with the preferred embodiment of the present invention for practicing the best mode thereof.

The load carrying sections 1 are hollows as can be seen specifically in FIG. 2 and is provided in its lower side with a slide-in groove 2. Guide rails 6 are held in these grooves 2 in a manner to be described more fully below. These guide rails 6 are provided to accommodate wheels such as 12 as well as guide rollers 13 pertaining to either the robot itself or the movable frame portion and carriage B.

The load carrying sections 1 are in addition provided with relatively simply constructed slide-in grooves 14 for fastening devices to which the load carrying section 1 are connected including particularly the legs C of the overall guide frame system. Please refer to the above identified application for details, though the fastening of the carriers 1 to mounting posts and legs is not a part of the present invention.

The upper slide-in groove 14.1 of load carrying section 1 may be connected to a compensation section 15 being constructed as a cable drag connecting elements 16. The section 15 together with rail 6 prevents temperature induced warping of the load carrying section 1.

Figure 1:
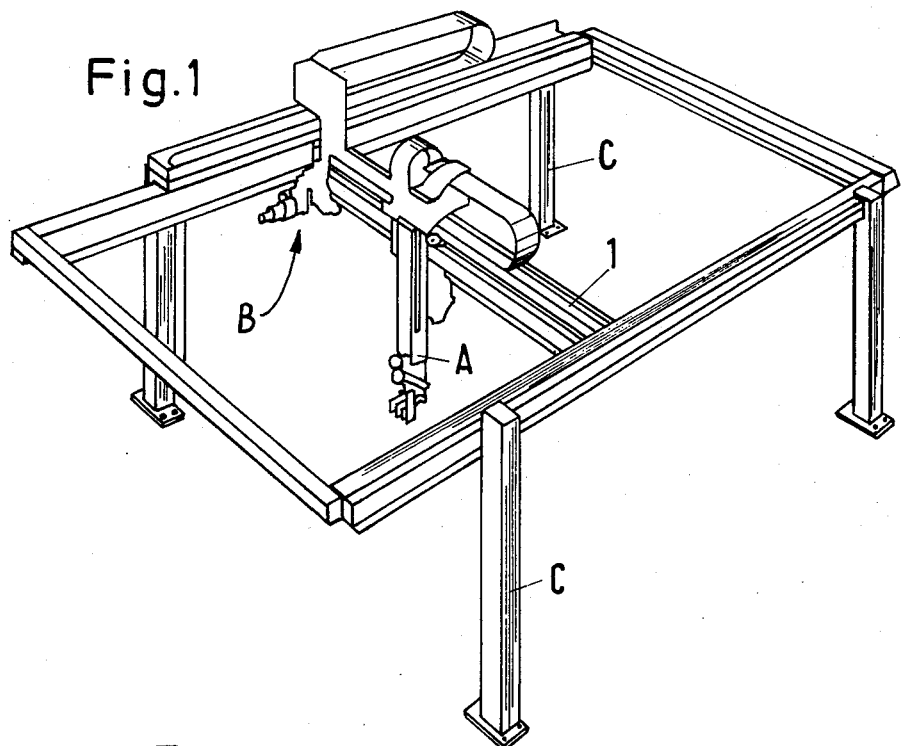
FIG. 1 is a perspective view of a rail system to which the invention pertains; the system is provided for positioning an industrial robot of the machine tool variety.

Upon inspecting closely the connection of the guide rail 6 to the load carrying section 1 as per FIG. 2 one can readily appreciate that in the case of a load such as one represented in FIG. 1, and under further consideration of the requirements for accuracy and precision as alluded to and described in the introduction, the connections between the guide rails 6 on one hand and the section 1 on the other hand is a rather critical task. The clamping elements 7 have to be constructed in order to obtain a very unambiguous and accurately predeterminable load and force distribution. The construction as illustrated includes particularly structure permitting the avoiding of drilling of bars into the rails 6.

The clamping elements 7 each include clamp disks 7.1 and 7.2 being interconnected by a bolt 8 there being nuts 9.1 and 9.2 accordingly. The bolt ultimately provides the force by means of what clamp parts 7.1 and 7.2 hold the rails 6.

Figure 3:
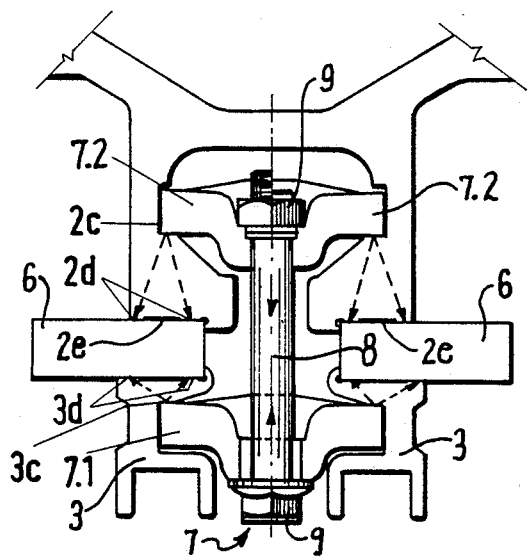
FIG. 3 illustrates the force and load distribution for connecting the rail to the section as per FIG. 2.

FIG. 3 illustrates the force as they act upon the rails 6. In each instance of clamping a holding rail 3 is interposed between clamp part 7.1 and the respective rail 6. Each rail is held from above against flanges of section 11 by means of two related narrow surfaces 2d, separated by a groove or indent 2e. From below each rail is acted upon by a holding rail 3 with two abutment surfaces 3d separated by an indent 3e.

Figure 4:
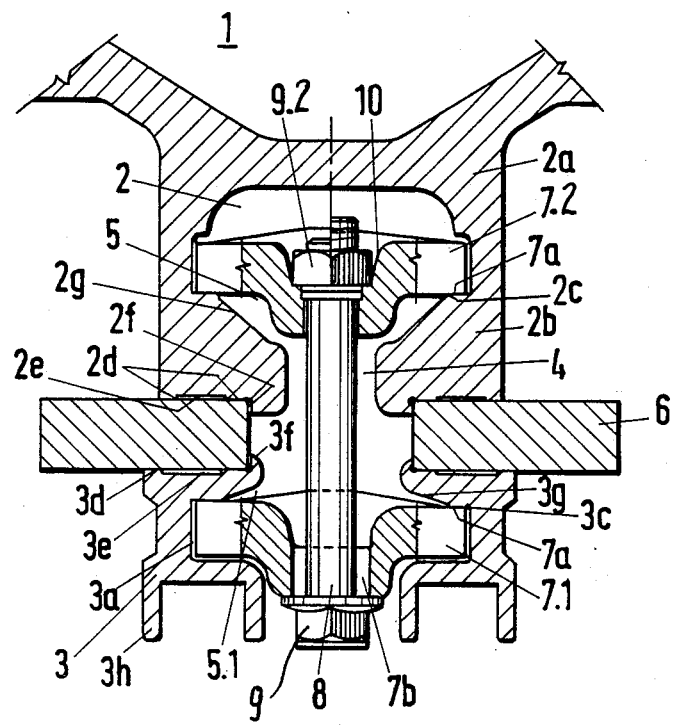
FIG. 4 illustrates a section and portion from FIG. 2 on an enlarged scale.

The load thus runs in between the abutment surfaces 2d and 3d. The load connecting line specifically running from a pressure force surface on the ledge 2c to the pressure surface 3c where the clamp part 7.1 acts on holding rail 3. And the connecting force line runs between the abutment surfaces 2d and the abutment surfaces 3d so that the rail is in fact held safely two fold and in between a twin or two point connection on both sides. Owing to this holding position the holding is provided in a tiltfree manner. FIG. 4 illustrates the groove 2 on a larger scale and shows specifically the groove bars 2a with adjoining clamping flanges 2b. A slot 4 is provided between the two flanges 2b for inserting of bolts such as 8, in between these flanges. The flanges 2b have pressure surfaces 2c on the upperside situated next to oblique surface portions 2g of the flanges so that a certain space 5 is established between the clamping pressure surfaces 7a of clamping element 7.2 and the clamping flanges 2b. The clamping flanges have on the respective underside and to both sides thereof pairs of abutment surfaces 2d for the rails 6 as stated. Aside from the respective recess 2e, next to one of them is an abutment stop edge 2f, against which rail 6 abuts.

The two juxtaposed rails 6 are held from below to clamping elements 7.1 which extend into the groove 3a of the holding rail 3; these rails are provided with pressure surfaces 3c. Also here is a free space 5.1 being established next to the respective clamping surfaces 7a of clamp part 7.1. There are also oblique portions 3g of the rails for holding the counterclamping part 7.1. As stated, in between the abutment surfaces 3d are provided indents 3e and next to them are lower abutment edges 3f for the rails 6.

Figure 5:
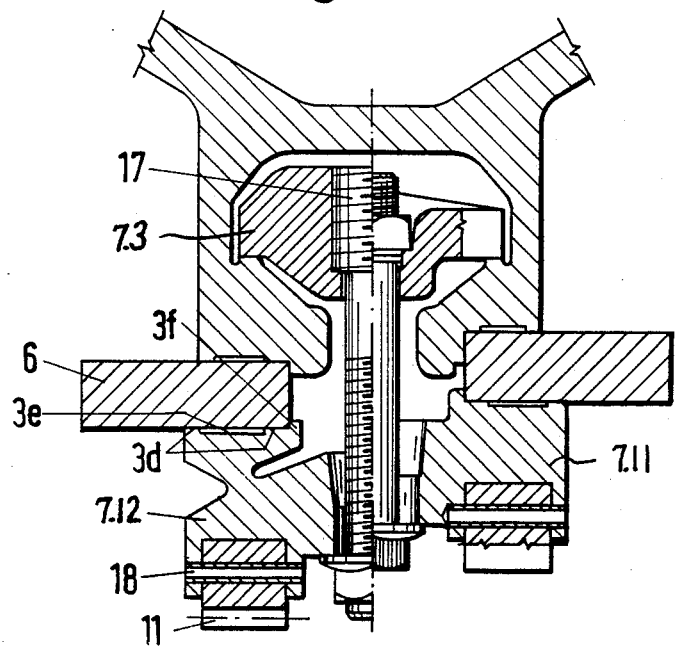
FIG. 5 illustrates cross sections through two variations in the fastening construction.

The holding rails 3 moreover each have U-shaped profile 3h for receiving drive rails 11 shown specifically in FIGS. 2 and 5. As stated, the clamping element 7.1 and 7.2 are acted upon by the bolts 8 and force the rails in between the two opposing pressure surfaces 2d and 3d. Suitable nuts or 9.1 and 9.2 are provided for the bolts 8 which are either provided with setting nuts or nuts are provided with locks such as 10 in terms of hex heads inserted in hexagonal indentations in the clamping part 7.1 and such as 7.2 in order to prevent undesired turning and loosening of the bolt connection. The clamping part 7.1 moreover has an additional oblong slot 7b for the bolt 8 for compensation of any tolerances and minor deviations.

Turning briefly to two modified examples shown to the left and to the right of the senter line in FIG. 5; many parts of that figure are, as can be seen, similar or similarly constructed or provided with minor deviations in contour. The lower clamping parts are shown as two different rails 7.11 and 7.12. In between the abutment surfaces 3d there are also provided with an indent and recess 3e as well as an abutment edge 3f for the guide rail 6. Drive rails 11 are likewise provided here in the clamping element 7.2 and they are fastened thereto to clamping sleeves 18.

In the left hand example the bolt is provided with a threaded insert 17 for threading into a thinner upper clamp part 7.3.

The invention is not limited to the embodiments described above but all changes and modifications thereof, not constituting departures from the spirit and scope of the invention, are intended to be included.

We claim:

1. Connection between a flange of a hollow load carrying section and at least comprising:
said flange having and being provided with a T-shaped insertion groove separating flange parts with clamping surfaces, there being indents respectively in the clamping surface of the flange parts;

said rail having and being provided with complimentary clamping surfaces; and clamping elements partially positioned in said groove and engaging narrow clamping surfaces of the flange in said groove as well as said clamping surfaces of said rail such that forces acting upon said flange part clamping surfaces actually run through said indents which are not in abutment with the rail.

2. Connection as in claim 1 said clamping elements having clamping surfaces directly engaging said flanges.

3. Connection as in claim 1 each of said clamping elements being comprised of a first element in engagement with the flange, a second element and bolt means interconnecting the first and second element for tensioning them, there being means for causing the second element to act on the rail.

4. Connection as in claim 3, there being means for preventing undue turn of the bolts or undue loosening thereof.

5. Connection as in claim 3, there being a holding rail interposed between a clamping element and the rail.

6. Connection as in claim 1; wherein the load carrying section includes a T-shaped groove opposite the position of said rails, and a thermal compensation section fastened to said T-shaped groove.

7. Connection as in claim 1, at least one of said clamping elements including an oblong slot for receiving said bolt.

8. Connection between a flange of a hollow load carrying section and at least one guide rail comprising:

said flange having and being provided with a T-shaped insertion groove separating flange parts, said flange parts each having a pair of abutment and clamping surfaces, said pair of said abutment and clamping surfaces being separated by an indent;

said rail having and being provided with clamping surfaces;

clamping parts positioned in said groove and engaging additional narrow clamping surfaces of the flange in said groove, the clamping surfaces of the flange parts engaging the clamping surfaces of said rail such that forces acting upon said surfaces run in the respective abutment portion of the clamping surfaces of said pair of said clamping and abutment surfaces of the respective flange part, and through the respective indent which is not in abutment with the rail;

a holding rail;

further damaging parts engaging said holding rail, said holding rail being urged by the further clamping parts against said rail, also in two spaced-part abutment surfaces being separated by an indent such that a clamping force runs through the respective latter indent in between the latter surfaces; and bolt means interconnecting the clamping parts and the further clamping parts in pairs to have the rail sandwiched between the flange and the holding rail.

9. Connection as in claim 8, there being rail stops in said holding rail and the flange.

10. Connection as in claim 8, the holding rail having a supplemental U-section for insertion of auxiliary equipment.

11. Connection between a flange of a hollow load carrying section and two guide rails comprising:

said flange including a T-shaped insertion groove separating flange parts, each flange part having a narrow, upper clamping surface and a downwardly oriented pair of clamping surfaces separated by an indent;

said two rails each including clamping surface;

clamping parts positioned in said groove and engaging said narrow clamping surfaces in said groove, the pair of clamping surfaces of one of said flange parts engaging one of said rails such that forces acting upon said surfaces run in between portions of the clamping surfaces and through the respective indents which are not in abutment with the rail;

a pair of holding rails;

further clamping parts engaging said holding rails, said holding rails being respectively urged against said rails by the further clamping parts also in two spaced part abutment surfaces each separated by an indent such that clamping forces run through the respective indent in between the latter surfaces of a pair; and bolt means interconnecting the clamping parts and the further clamping parts to have the rail sandwiched between the flanges and the holding rails.

* * * * *